R. TAYLOR.
APPARATUS FOR MOLDING CRUCIBLES AND POTS.
No. 192,604. Patented July 3, 1877.
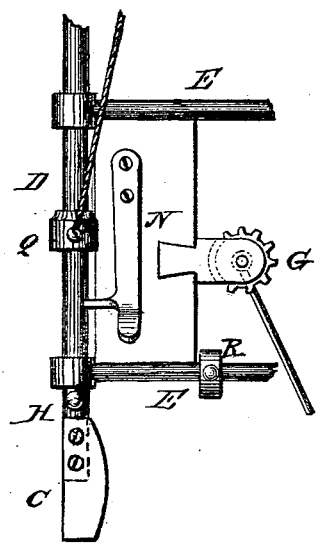
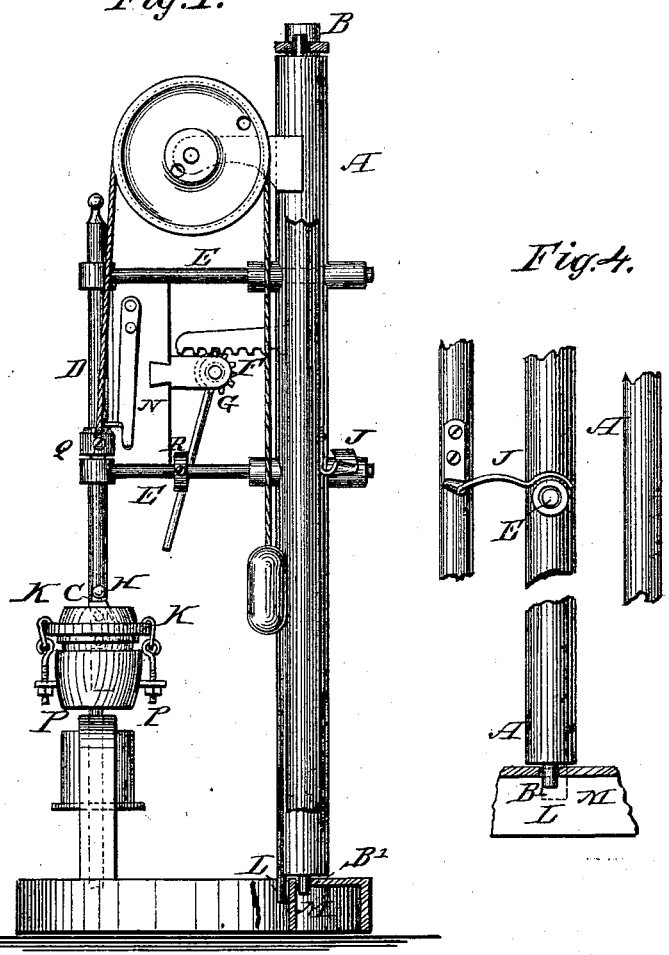
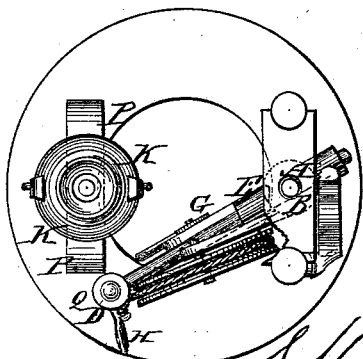

UNITED STATES PATENT OFFICE.

ROBERT TAYLOR, OF PHILADELPHIA, PENNSYLVANIA.

IMPROVEMENT IN APPARATUS FOR MOLDING CRUCIBLES AND POTS.

Specification forming part of Letters Patent No. 192,604, dated July 3, 1877; application filed April 4, 1877.

*To all whom it may concern:*

Be it known that I, ROBERT TAYLOR, of the city and county of Philadelphia, and State of Pennsylvania, have invented certain new and useful Improvements in Apparatus for Molding Crucibles and Pots.

This invention is an additional improvement on the apparatus for molding crucibles and pots for which Letters Patent of the United States, dated December 1, 1868, and numbered 84,593, were granted to myself and the late Frederick Strow, deceased; and consists in a means of turning aside the portion of the apparatus for holding the sweep or former during the operation of introducing and withdrawing the mold from the revolving table, and also in devices for firmly holding the former in position during the molding operation; and I do hereby declare the following to be a sufficiently full, clear, and exact description thereof to enable others skilled in the art to make and use the same, referring to the drawing annexed, and forming a part of this specification.

Figure 1 is a side elevation. Fig. 2 is a plan; and Figs. 3 and 4 show parts involved in the latching and unlatching operations, drawn on an enlarged scale.

A represents the column of the machine, which is made to turn upon gudgeons B and B' at the top and bottom, or may be made hollow and turn upon a central shaft.

The rotary motion of the column A is restricted in one direction by a stop, L, formed on it, and a stationary stop, M. The former C is borne upon a vertical slide, D, supported by a horizontal slide, E, supported by a column, A, worked by a rack, F, and pinion G, or other equivalent mechanism, horizontally and vertically, by the direct application of the hand of the operator to the handle H on the slide D. The motion of the slides D and E are restricted by adjustable collars, as set forth in the patent already referred to.

A latch, J, serves to hold the former C over the mold K by holding the column A so that the stop L on the column A is in contact with the stationary stop M. A latch, N, on the slide D holds the former down, so that the bottom of the crucible or pot that is being molded will be of the thickness determined by the position in which the latch N holds down the slide D, bearing the former C. A lever, O, or other equivalent mechanism, serves to bring the control of the latch J within convenient reach of the operator.

The slide D and former C may be equally counterbalanced by a weight or spring; but preferably it may be so hung that when brought down by the operator, as shown, with a weight or spring, the preponderance of the slide D and former C will hold it down, and when up the weight or spring will hold it up.

The revolving table P and mold K are similar to those described in the Letters Patent numbered 84,593, already referred to.

The operation of the machine is as follows: The former C, being up and turned aside, and the mold K being secured on the revolving table P, is caused to rotate, and the mass of clay and plumbago, or other plastic material, is placed in it. The slides bearing the former C are turned on the column until the stop L meets the stop M, and the latch J holds it in position. The former being over the center of the mold K, the mold is caused to rotate, and the slide D and former C are pressed down to the limit fixed by the collar Q on the slide D. The clay thus has a cavity pressed in it equal to the depth of the intended crucible or pot. The latch N then holds the former C and slide D down, after which the operator presses the curved side of the former C outward, and causes the clay to assume the form of the former C internally, and the thickness is regulated and determined by the adjustable collar R on the slide E. After the internal form of the crucible has been produced, the edges are trimmed off, the latch N released, the former C and slide D raised, and the latch J is then released and the slide turned aside, the rotation of the mold stopped, and the mold and contained crucible or pot removed.

I am thus enabled, with less labor and greater certainty than heretofore, to produce crucibles or pots of uniform shape, thickness, and finish.

Having described my invention and the mode of operating the same, what I claim as new therein is—

1. The swinging column, provided with stops L and M and a latch, J, bearing the guides and slides for holding the former C in a molding-machine, as set forth.

2. The latch N, combined with the vertical slide and former C, for determining the thickness of the crucible-bottom.

ROBERT TAYLOR.

Witnesses:
CHAS. E. PANCOAST,
DAVID SMITH.